July 23, 1963

R. A. PRINGLE ETAL
LOW ELECTRICAL RESISTANCE COMPOSITION
AND CABLE MADE THEREFROM
Filed March 30, 1961

3,098,893

Inventor:
Ross A. Pringle
Charles F. Wallace Jr.
by Allard A. Braddock
Their Attorney United States Patent Office 3,098,893
Patented July 23, 1963

3,098,893
LOW ELECTRICAL RESISTANCE COMPOSITION AND CABLE MADE THEREFROM
Ross A. Pringle, Woodbridge, and Charles F. Wallace, Jr., Fairfield, Conn., assignors to General Electric Company, a corporation of New York
Filed Mar. 30, 1961, Ser. No. 99,559
8 Claims. (Cl. 174—102)

This invention relates to a low electrical resistance composition of matter and to an electrical cable making use of the composition. More particularly, the invention relates to a low electrical noise type of cable.

It is a well known fact that relative motion between an insulator of high resistivity and a conductor or conducting shield can cause the generation of voltage differences sufficient to produce an objectionable noise level in certain types of cable. The principal object of the present invention is to provide a low electrical resistance composition of matter and a cable utilizing this composition in which the effect of the composition is to dissipate this voltage as it is produced thus preventing a buildup of voltage to a level where electrical noise would be produced by its discharge.

Figure 1:
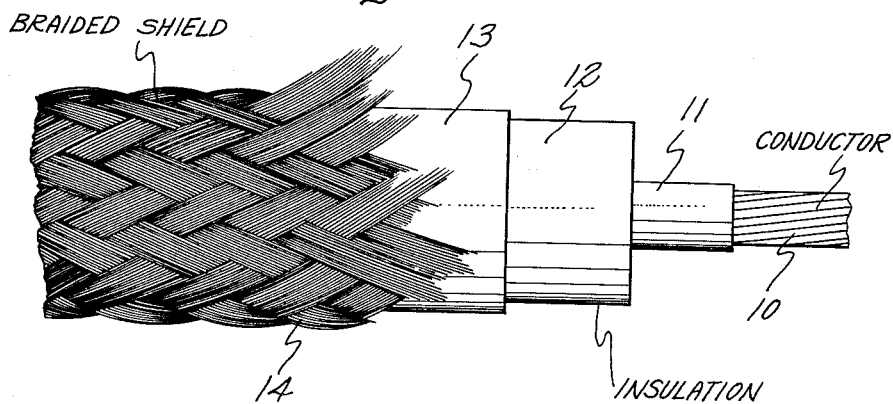
Figure 2:
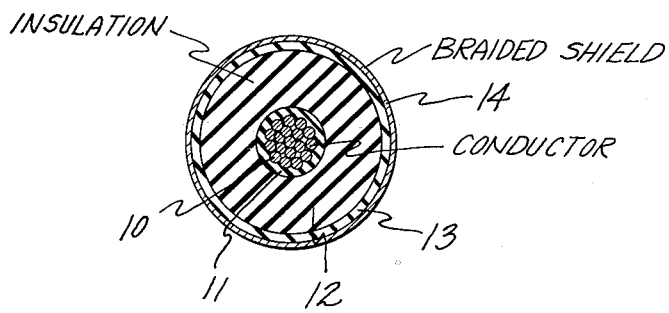

Other objects of the invention will become apparent from the following specification considered in conjunction with the attached drawing wherein FIG. 1 is a view of an electrical cable incorporating the composition of this invention, the various layers of composition and insulation being cut back in order to show structure of the cable; and FIG. 2 is a sectional view of the cable of FIG. 1.

Briefly stated, the invention is directed to a low electrical resistance composition comprising 30 to 70 weight percent of polybutene having a mean molecular weight of 1500 to 2500, 7 to 15 weight percent of a carbon black having a volume resistivity of 10 to 30 ohm-cm. when the black is incorporated in a natural rubber mixture consisting of one-third by weight of the black, and the remainder a dialkyl phthalate in which there is incorporated from 0.2 to 1.0 weight percent of bisphenol A or derivatives thereof. The invention is also directed to a cable in which this composition is incorporated.

The low electrical resistance composition of this invention comprises a polybutene of suitable viscosity, a dialkyl phthalate plasticizer having incorporated therein a small quantity of bisphenol A, or derivative thereof, and a highly conductive carbon black dispersed therein. Since the components of the composition must meet rather specific requirements, they will be disclosed below in some detail.

The polybutene is a viscous liquid having a mean molecular weight of 1500 to 2500 with about 1900 being a preferred mean molecular weight. Material meeting this specification is sold by Amoco Chemical Corporation under the designation "Indopol H–1900."

The carbon black is an oil furnace black highly structured in order to increase its conductivity. Expressed in terms of volume resistivity, i.e., the resistance in ohms of a cubic centimeter of the material when the electrodes are formed by two opposite (square centimeter) sides, and assuming that the measurement is made on a natural rubber compound in which the carbon black is present to the extent of one-third by weight, the desired range of resistivity is 10–30 ohm-cm. Such a carbon black is sold by The Cabot Corporation, under the designation "Vulcan XC–72." The average particle diameter of the carbon black is 29 millimicrons, its area is 210 square meters per gram, its oil absorption is 2.60 cubic centimeters per gram, its volatile content is about 1.8 percent, and its bulk density is 12.5 pounds per cubic foot. Obviously, any carbon black having volume resistivity of 10–30 ohm-cm. measured on a comparable basis would be satisfactory for use in this composition and, therefore, the carbon black will be described hereinafter in terms of its volume resistivity.

Plasticizers used in the composition are dialkyl phthalates such as di-tridecyl phthalate and diisodecyl phthalate. Incorporated in the plasticizer is from 0.2 to 1.0 weight percent of bisphenol A, a compound having the structure

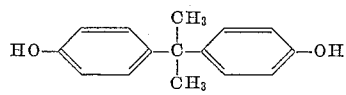

or a derivative of bisphenol A such as a compound of the structure

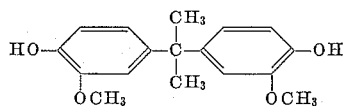

or

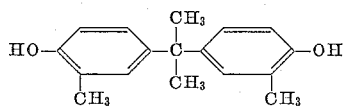

Referring to the drawing, a cable incorporating the composition of this invention comprises a conductor 10 with an overlying layer 11 of the above-described composition applied as by pumping, dipping, or extrusion. An insulating layer 12 of polyethylene is applied over the layer 11 as by extrusion.

Overlying the polyethylene insulation layer 12 is a layer 13 also of low electrical resistance. The layer 13 consists of 30 to 70 parts by weight of a carbon black similar to the carbon black in the layer 11, i.e., a carbon black having a volume resistivity of 10 to 30 ohm-cm. when incorporated in a natural rubber mixture consisting of one-third by weight of the carbon black. The other 30 to 70 percent is butyl rubber. A preferred carbon black-butyl rubber mixture is about equal parts by weight of each component. The layer 13 may be applied in a lacquer tower provided a solvent is added to the carbon black-butyl rubber mixture in order to reduce the viscosity to a low level. A suitable solvent for this purpose is a low-boiling naphtha such as is sold under the designation "Sovasol No. 1" by Socony Mobil Oil Co., Inc. Sufficient solvent is added to obtain about 20 seconds viscosity on a Zahn #2 cup.

While it is not necessary, it is frequently desirable to add a metallic braided shield 14 to the outside of the cable. The shield 14 can improve the low noise characteristics of the cable and, in addition, serves to protect it in locations where it is subjected to rough handling. The cable of this invention is primarily for use where its low noise characteristics are valuable. However, its electrical characteristics are such that it is satisfactory for use as power cable also.

While the invention has been described with reference to certain specific embodiments, it is obvious that there may be variations which will still fall within the proper scope of the invention. Therefore, the invention should be limited in scope only as may be necessitated by the scope of the appended claims.

What we claim as new and desire to secure by Letters Patent of the United States is:

1. A low electrical resistance composition comprising 30 to 70 weight percent of polybutene having a mean molecular weight of 1500 to 2500, 7 to 15 weight percent of a carbon black having a volume resistivity of 10 to 30 ohm-cm. when incorporated in a natural rubber mixture consisting of one-third by weight of said carbon black, and the remainder a dialkyl phthalate in which there is incorporated from 0.2 to 1.0 weight percent of a compound selected from the group consisting of bisphenol A and derivatives thereof.

2. An electrical cable comprising: a metallic conductor; an overlying layer of low-resistance composition consisting of 30 to 70 weight percent of polybutene having a mean molecular weight of 1500 to 2500, 7 to 15 weight percent of a carbon black having a volume resistivity of 10 to 30 ohm-cm. when incorporated in a natural rubber mixture containing one-third by weight of said carbon black, and the remainder a dialkyl phthalate in which there is incorporated from 0.2 to 1.0 weight percent of a compound selected from the group consisting of bisphenol A and derivatives thereof; a layer of polyethylene overlying said low-resistance layer; and an outer layer consisting of 30 to 70 weight percent of a carbon black having a volume resistivity of 10 to 30 ohm-cm. when incorporated in a natural rubber mixture consisting of one-third by weight of said carbon black and the remainder butyl rubber.

3. A low electrical resistance insulating composition comprising about 45 weight percent of polybutene having a mean molecular weight of 1500 to 2500, about 10 weight percent of a carbon black having a volume resistivity of 10 to 30 ohm-cm. when incorporated in a natural rubber mixture consisting of one-third by weight of said carbon black, and about 45 weight percent of dialkyl phthalate in which there is incorporated from 0.2 to 1.0 weight percent of a compound selected from the group consisting of bisphenol A and derivatives thereof.

4. An electrical cable comprising: a metallic conductor; a layer of low-resistance composition on said conductor, said layer consisting of about 45 weight percent of polybutene having a mean molecular weight of 1500 to 2500, about 10 weight percent of a carbon black having a volume resistivity of 10 to 30 ohm-cm. when incorporated in a natural rubber mixture consisting of one-third by weight of said carbon black, and about 45 weight percent of dialkyl phthalate in which there is incorporated from 0.2 to 1.0 weight percent of a compound selected from the group consisting of bisphenol A and derivatives thereof; an overlying insulating layer of polyethylene; and an outer layer consisting of about 50 parts by weight of butyl rubber and 50 parts by weight of a carbon black having a volume resistivity of 10 to 30 ohm-cm. when said black is present in a mixture with natural rubber consisting about one-third by weight of said black.

5. A composition of matter as claimed in claim 4 wherein the dialkyl phthalate is diisodecyl phthalate.

6. A composition of matter as claimed in claim 4 wherein the dialkyl phthalate is di-tridecyl phthalate.

7. A low electrical resistance composition comprising about 45 weight percent of polybutene having a mean molecular weight of about 1900, about 10 weight percent of a carbon black having a volume resistivity of 10 to 30 ohm-cm. when incorporated in a natural rubber mixture consisting of one-third by weight of said carbon black, and about 45 weight percent of dialkyl phthalate in which there is incorporated from 0.2 to 1.0 weight percent of bisphenol A.

8. An electrical cable comprising: a metallic conductor; a layer of low electrical resistance composition on said conductor, said layer consisting of about 45 weight percent of polybutene having a mean molecular weight of about 1900, about 10 percent of a carbon black having a volume resistivity of 10 to 30 ohm-cm. when incorporated in a natural rubber mixture consisting of one-third by weight of said carbon black, and about 45 weight percent of dialkyl phthalate in which there is incorporated from 0.2 to 1.0 weight percent bisphenol A; an overlying insulating layer of polyethylene; and an outer layer consisting of about 50 parts by weight of butyl rubber and 50 parts by weight of a carbon black having a volume resistivity of 10 to 30 ohm-cm. when said black is present in a mixture with natural rubber consisting about one-third by weight of said black.

References Cited in the file of this patent
UNITED STATES PATENTS 2,377,153     Hunter et al. _____ May 29, 1945